US008165646B2

(12) United States Patent
Zheng

(10) Patent No.: US 8,165,646 B2
(45) Date of Patent: Apr. 24, 2012

(54) EARPHONE LINE RETRACTING DEVICE, AUTOMATIC LINE RETRACTING EARPHONE, NON-RADIATION WIRE MOBILE PHONE AND ELECTRONIC DEVICE

(75) Inventor: Daqing Zheng, Wulumuqi (CN)

(73) Assignee: Xinjiang Tiandi Group, Wulumuqi (CN)

( * ) Notice: Subject to any disclaimer, the term of this patent is extended or adjusted under 35 U.S.C. 154(b) by 588 days.

(21) Appl. No.: 12/351,389

(22) Filed: Jan. 9, 2009

(65) Prior Publication Data

US 2010/0151922 A1 Jun. 17, 2010

(30) Foreign Application Priority Data

Mar. 10, 2008 (CN) .......................... 2008 1 0101651
Dec. 15, 2008 (CN) .......................... 2008 1 0183186

(51) Int. Cl.
*H04M 1/00* (2006.01)

(52) U.S. Cl. ............... 455/575.2; 455/550.1; 455/569.1; 455/575.6; 455/575.8; 379/433.11; 379/433.12; 379/433.13; 361/679.02; 361/679.03; 361/679.55; 361/679.56; 381/384

(58) Field of Classification Search .............. 455/569.1, 455/575.1, 575.2, 575.5, 575.6, 575.8, 550.1; 379/433.11, 433.12, 433.13; 361/679.02, 361/679.03, 679.55, 679.56; 381/384
See application file for complete search history.

(56) References Cited

U.S. PATENT DOCUMENTS

| | | | | |
|---|---|---|---|---|
| 4,942,617 A | * | 7/1990 | Boylan | ........................ 381/182 |
| 5,422,951 A | * | 6/1995 | Takahashi et al. | ........... 379/454 |
| 5,832,098 A | * | 11/1998 | Chen | ............................ 381/370 |
| 6,199,674 B1 | * | 3/2001 | Liao | ............................ 191/12.4 |
| 6,374,089 B1 | * | 4/2002 | Till | .............................. 455/90.1 |
| 6,438,248 B1 | * | 8/2002 | Kamimura et al. | ........... 381/374 |
| 6,858,951 B2 | * | 2/2005 | Liao | .............................. 290/1 C |
| 7,079,872 B2 | * | 7/2006 | Khalid et al. | ................. 455/566 |
| 7,297,001 B2 | * | 11/2007 | Wu | .................................... 439/4 |
| 7,308,109 B2 | * | 12/2007 | Jeong et al. | .................... 381/384 |
| D566,107 S | * | 4/2008 | Bowling | ........................ D14/223 |
| D583,362 S | * | 12/2008 | Hsu et al. | ...................... D14/205 |
| D600,673 S | * | 9/2009 | Kim et al. | ..................... D14/205 |
| 7,758,005 B2 | * | 7/2010 | Uemura | ................... 248/346.06 |

FOREIGN PATENT DOCUMENTS

| | | |
|---|---|---|
| JP | 56-017779 U | 2/1981 |
| JP | 2-113492 U | 2/1989 |
| JP | 11-44504 A | 6/1989 |
| JP | 8-098291 A | 4/1996 |
| JP | 11-298983 A | 10/1999 |
| JP | 2001-127864 A | 5/2001 |
| JP | 2002-159084 A | 5/2002 |
| JP | 2002-171326 A | 6/2002 |
| JP | 2008-269799 A | 11/2006 |
| JP | 2007-173089 A | 7/2007 |
| JP | 3-140018 U | 3/2008 |
| JP | 2008-193688 A | 8/2008 |

\* cited by examiner

*Primary Examiner* — Olumide T Ajibade Akonai
(74) *Attorney, Agent, or Firm* — Birch, Stewart, Kolasch & Birch, LLP

(57) ABSTRACT

The present invention provides an earphone line retracting device, and an automatic line retracting earphone having the earphone line retracting device, a non-radiation wire mobile phone having the earphone line retracting device, and an electronic device having the earphone line retracting device. The earphone line retracting device at least comprises: a winder, drive means driving the winder, and signal connector means, characterized in that the earphone line retracting device further comprises shift gear means, by which the drive means drives the winder.

26 Claims, 7 Drawing Sheets

EARPHONE LINE RETRACTING DEVICE, AUTOMATIC LINE RETRACTING EARPHONE, NON-RADIATION WIRE MOBILE PHONE AND ELECTRONIC DEVICE

FIELD OF THE INVENTION

The present invention relates to an earphone line retracting device, an automatic line retracting earphone, a non-radiation wire mobile phone and an electronic device.

BACKGROUND OF THE INVENTION

With the extensive application of electronic products such as mobile phones, laptop computers, and the products with capability of aiding hearing, etc., it has been found that the earphone of the above products has problems of winding, knotting, and inconvenience of taking and keeping in use, which has caused some troubles to users and even further made some users give up using earphone. In addition, when using the electronic products, the users cannot avoid electromagnetic radiation resulting from the electronic products, causing harm to the users' health. For example, when the user puts the mobile phone on his ear to communicate with other person, the electromagnetic radiation resulting from the mobile phone causes harm to the user's brain. It has been found from experiments and study that the harm resulting from electromagnetic radiation to the brain is reduced dramatically when the mobile phone keeps a distance away from the ear by, for example, replacing the speaker inside the mobile phone with a earphone. By this way, the harm resulting from electromagnetic radiation to the brain is reduced 99%.

Chinese patent No. 200510004919.9 discloses a mobile phone with a built-in non-radiation earphone and a built-in non-radiation earphone assembly in which a earphone line is wound by a winder built in the mobile phone, so that when the mobile phone is not used, the earphone line is wound into the mobile phone by the built-in winder, and thus avoid knotting, winding, and facilitate to take and use the earphone, as well as reduce dramatically the electromagnetic radiation. However, it is known from specification and the figures that drive means (a micromotor, or a spring, or a clockwork spring) in an earphone line retracting device directly drives the winder, and thus, when a micromotor is used as the drive means, because the micromotor rotates with high speed and low torque, it can not provide enough torque to make the winder rotate. If the torque of the micromotor is increased, the size of the micromotor is increased too, and as a result, the drive means can not be built in the small mobile phone. Even though the size of the mobile phone can be increased to accommodate a big motor, the members of the mobile phone can also be damaged or even the user can be harmed due to the high speed of the motor. In addition, when a spring or a clockwork spring is used as the drive means, the torque of the spring or of the clockwork spring is big or bigger enough, but winding distance is short, and thus, when the spring or the clockwork spring drives the winder, the retracting distance is short, and thus can not retract the line well.

SUMMARY OF THE INVENTION

In order to solve the above problems, the object of the present invention is to provide an earphone line retracting device to solve the problem existing in the prior art that the speed of the winder is high, the torque of the winder is not big enough, or the winding distance is short when the drive means directly drives the winder.

Another object of the present invention is to provide an automatic line retracting earphone having the earphone line retracting device.

Another object of the present invention is to provide a non-radiation wire mobile phone having the automatic line retracting earphone.

Another object of the present invention is to provide an electronic device having the automatic line retracting earphone.

In order to solve the above problems, an earphone line retracting device according to the present invention at least comprises: a winder, drive means driving the winder, and signal connector means, characterized in that the earphone line retracting device further comprises shift gear means, by which the drive means drives the winder.

Preferably, a clutch is arranged between the shift gear means and the winder, the winder connected to the shift gear means by the clutch.

Preferably, the drive means is a micromotor; the shift gear means is decelerator means.

Preferably, the drive means is a spring or a clockwork spring, the shift gear means is accelerator means.

Further; the winder has an inside space, the drive means positioned in the inside space.

Preferably, the shift gear means has at least two gears, adjacent gears engaging each other.

Preferably, the signal connector means comprises a circuit board and a plurality of annular conductive sheets, and connects to outside signal by spring feeler and its lead wire.

Preferably, the signal connector means is a wirelessly connected signal connector means.

Preferably, the clutch is a resistance oil clutch.

Preferably, the earphone line retracting device is built in the housing of an electronic device.

Preferably, when the drive means is a micromotor, the power source of the earphone line retracting device is also the power source of the electronic device in which the earphone line retracting device is built.

Preferably, when the drive means is a spring or a clockwork spring, the retracting switch of the earphone line is a press wheel.

An automatic line retracting earphone according to the present invention comprises: an earphone, an earphone line, and an earphone line retracting device described above.

A non-radiation wire mobile phone according to the present invention comprises: a main body of the mobile phone, an earphone, an earphone line, and an earphone line retracting device. The housing of the non-radiation wire mobile phone is provided with a socket for the earphone. The earphone can be removably inserted into the socket. The earphone line and the earphone line retracting device are arranged in the housing of the mobile phone. The earphone line retracting device at least comprises a winder, drive means driving the winder, and signal connector means. The earphone is provided with a voice transmitter. The earphone is formed integrally with the voice transmitter and a voice receiver. The non-radiation wire mobile phone according to the present invention is characterized in that:

the earphone line retracting device further comprises shift gear means, by which the drive means drives the winder.

An electronic device according to the present invention comprises: a main body of the electronic device, an earphone, an earphone line, and an earphone line retracting device. The housing of the electronic device is provided with a socket for the earphone. The earphone can be inserted into the socket.

The earphone line and the earphone line retracting device are arranged in the housing of the mobile phone. The earphone line retracting device at least comprises a winder, drive means driving the winder, and signal connector means. The electronic device according to the present invention is characterized in that:

the earphone line retracting device further comprises shift gear means, by which the drive means drives the winder.

DETAILED DESCRIPTION OF THE INVENTION

The detailed description of the present invention is made by reference to the drawings.

First Embodiment

Figure 1:
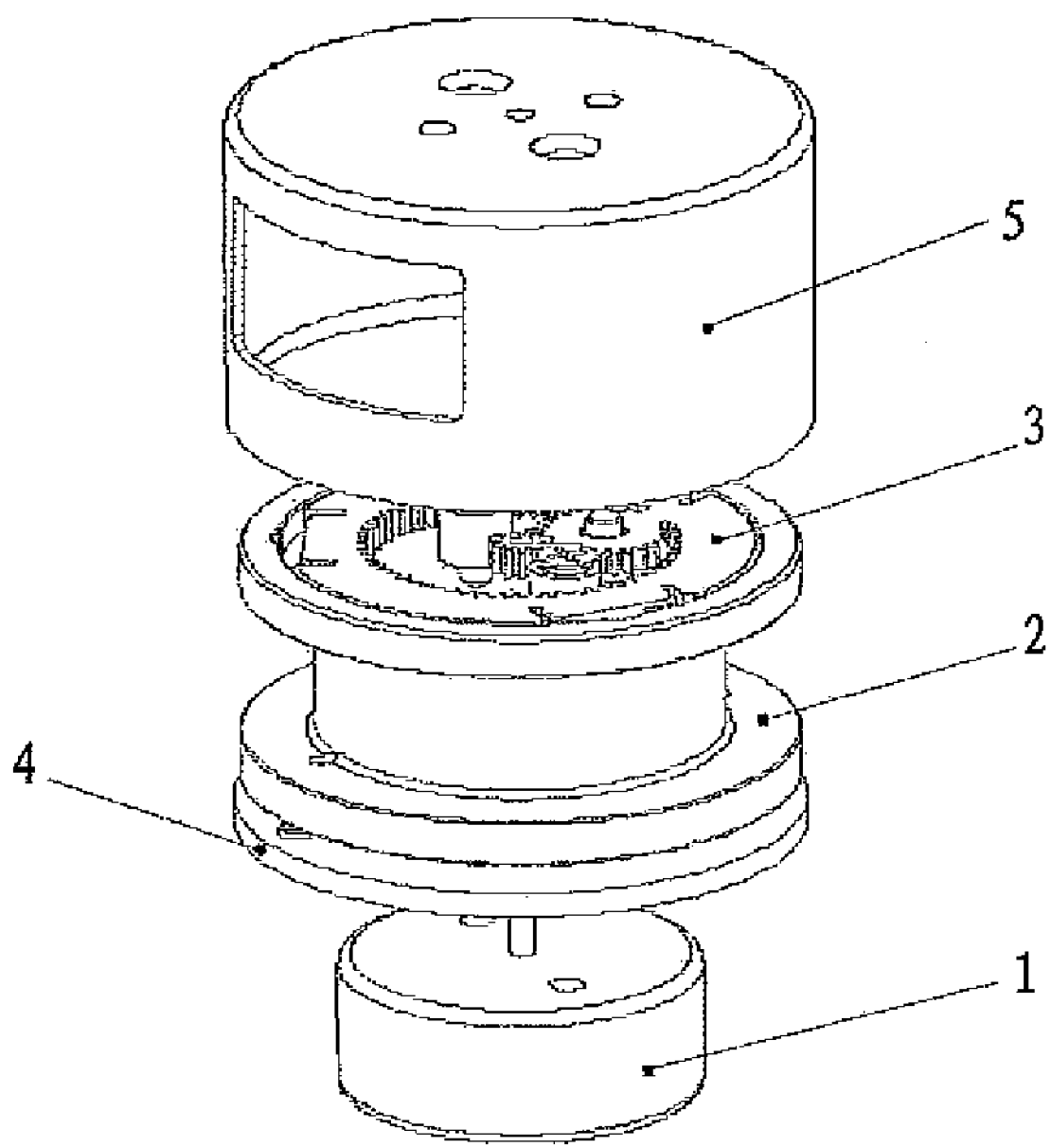
FIG. 1 is a view showing the structure of an earphone line retracting device of the first embodiment according to the present invention.

FIG. 1 is a view showing the structure of an earphone line retracting device of the first embodiment according to the present invention. As shown in FIG. 1, an earphone line retracting device comprises: a micromotor 1, a winder 2, a decelerator means 3, signal connector means 4, and a housing 5. When the earphone line retracting device is put inside an electronic device, the housing is not needed. As shown in FIG. 1, in this embodiment, in order to reduce the size of the earphone line retracting device, there is a space in winder 2 in which micromotor 1 is positioned. Alternatively, there is not a space in winder 2, and in this case, micromotoe 1 is positioned outside winder 2.

Figure 2:
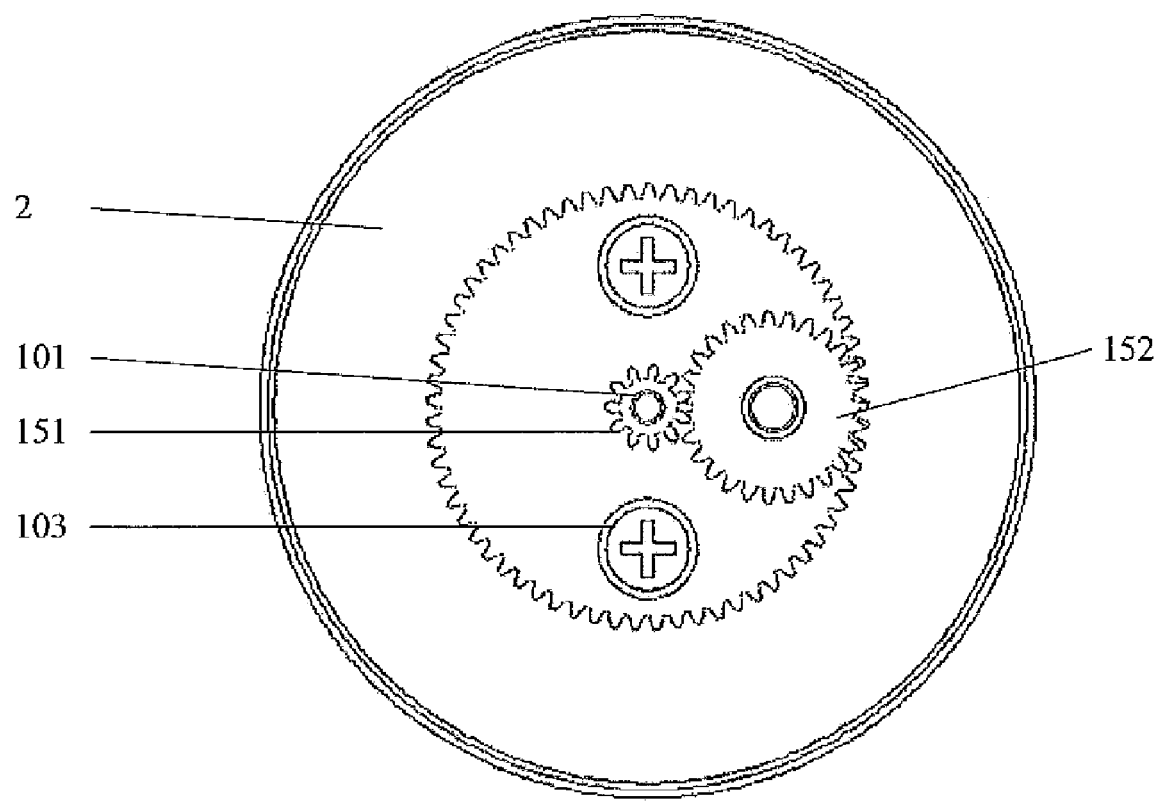
FIG. 2 is a top view of the earphone line retracting device of the first embodiment according to the present invention.

FIG. 2 is a top view of the earphone line retracting device of the first embodiment according to the present invention. As shown in FIG. 2, decelerator means 3 comprises gear 151 and gear 152. Gear 152 connects to winder 2 by its outer teeth. Gear 151 and gear 152 engage each other and are mounted on drive axis 101 of micromotoe 1. When drive axis 101 rotates, gear 151 and gear 152 rotate, causing winder 2 to rotate. Nut 103 is used to fix decelerator means 3 and micromotoe 1.

It is understood that gear 151 and gear 152 in decelerator means 3 shown in FIG. 2 are used to illustrate the embodiment. The persons skilled in the art can determine the number and the size of the gear, and determine the position relationship of the micromotor and the winder according to the practical needs. The embodiment of the present invention does not intend to make limitations. For example, the gear can be three or more in which the gears are arranged in a proportion and two adjacent gears engage each other.

Figure 3:
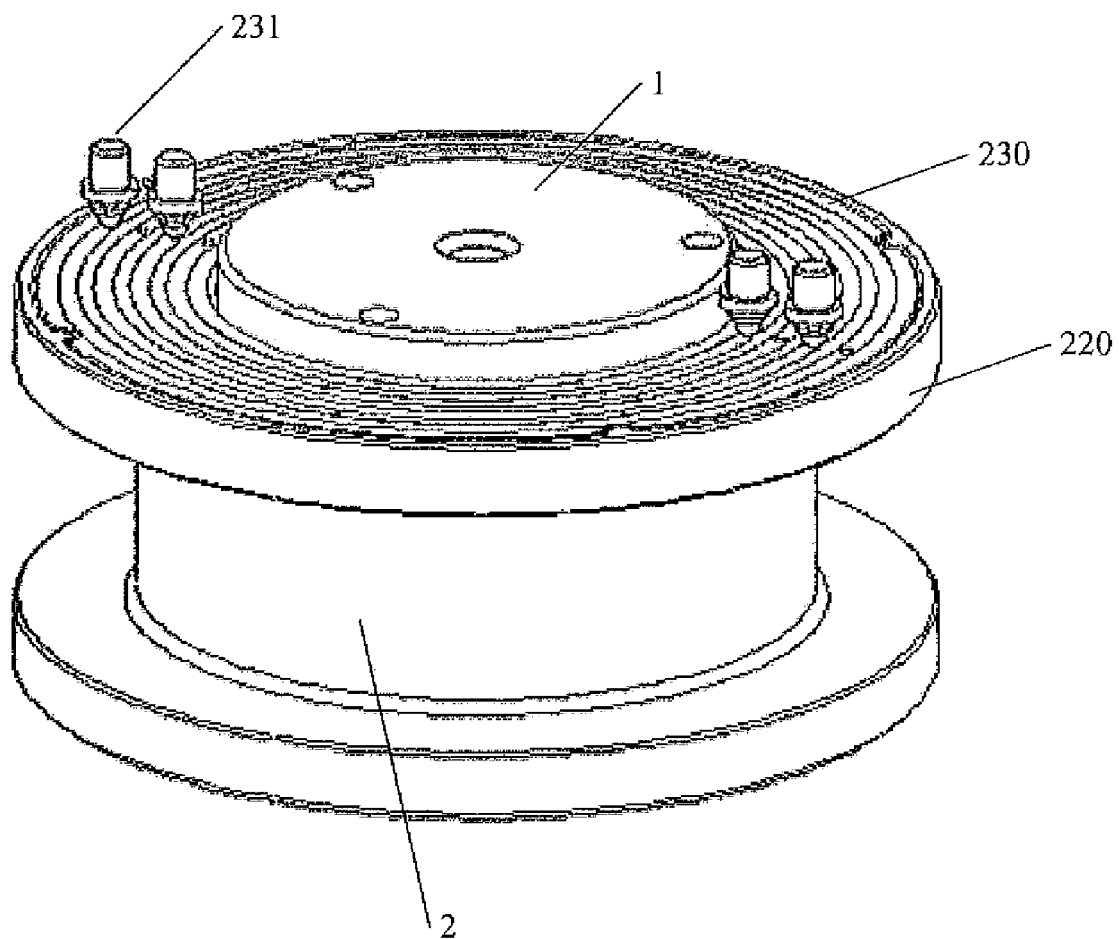
FIG. 3 is a view showing the structure of a signal connector means of the earphone line retracting device of the first embodiment according to the present invention.

FIG. 3 shows the other side of winder 2, namely, the structure of a signal connector means 4. As shown in FIG. 3, signal connector means 4 in the embodiment comprises a circuit board 220 and a plurality of annular conductive sheets 230. The plurality of annular conductive sheets 230 are connected to one end of the earphone line, and are connected to outside signal line (when signal connector means 4 is arranged in an electronic device, the outside signal line is the signal line inside of the electronic device) by spring feeler 231 and lead wire (not shown). In the structure described above, when winder 2 rotates to cause the earphone line to wind or spread, one end of the earphone line keeps connected to the outside signal by annular conductive sheets 230 and spring feeler 231, whereby maintaining connection and effectiveness of the signal. It is understood that the signal connector means in the present invention can be wireless signal connector means.

According to the earphone line retracting device of the present invention, when micromotor 1 rotates, gear 151 and gear 152 connected to micromotor 1 rotate, causing winder 2 to rotate, whereby achieving the effect of low speed and high torque.

In the prior art, a micromotor rotates to directly drive a winder to rotate in order to retract earphone line. Because the micrometer rotates at as high as thousands rpm (rounds per minute) to tens of thousand rpm, the earphone line is retracted instantly by the winder. The too high speed of the retraction of the line may cause damage to the device and to the user By contrast, in the present invention, there is decelerator means in which gears engage each other, so that the speed of the winder reduces to a proper and safe range and at the same time increases torque of the motor, whereby solving the problems existing in the prior art.

Second Embodiment

The following is another embodiment of the invention. In this embodiment, the drive means is a spring or a clockwork spring, and the shift gear means connected to the spring or the clockwork spring is accelerator means. The structure of the accelerator means is opposite to the structure of the decelerator means in the first embodiment, namely, the number of the teeth of the gear on the side of the spring or the clockwork spring is less than the number of the teeth of the gear on the side of the winder. Other parts in this embodiment are the same as in first embodiment. In addition, in this embodiment, the retracting switch of the earphone line retracting device is a press wheel. The description of the press wheel can be found in Chinese patent No. 200510004919.9, and thus the description of the press wheel is omitted. In this embodiment, the accelerator means can increase retracting distance, so that the earphone line can be retracted wholly in the earphone line retracting device.

Third Embodiment

Figure 4:
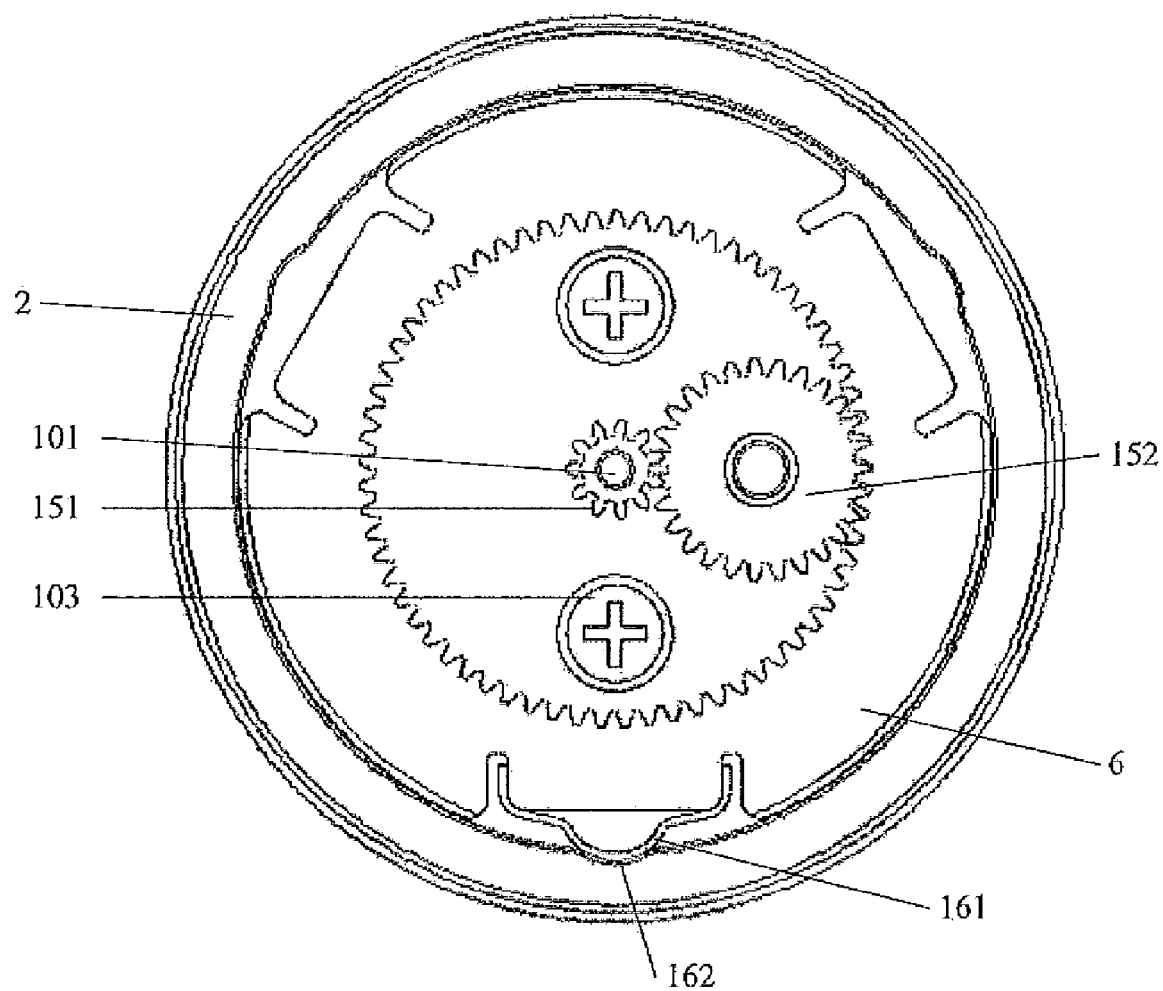
FIG. 4 is a top view of an earphone line retracting device of the third embodiment according to the present invention.

The following is another embodiment of the invention. FIG. 4 is a top view of the third embodiment according to the present invention. As shown in the figure, the difference between the earphone line retracting device in the third embodiment and the earphone line retracting device in the first embodiment is that a clutch 6 is arranged between winder 2 and decelerator means 3, and winder 2 is connected to decelerator means 3 by clutch 6. Inside clutch 6 is provided with gear engaging gear 152. Outside clutch 6 is provided with one or plurality of convex 161. Convex 161 engage concave 162 on winder 2. Other parts in this embodiment are the same as in first embodiment.

Preferably, the convex on the outside of clutch is resilient. For example, the convex can be spring sheet.

The force exerted by concave 162 on convex 161 is bigger than a predetermined threshold. The convex 161 causes winder 2 to rotate via concave 162. When the force exerted by concave 162 on convex 161 is smaller than a predetermined threshold, convex 161 stops causing winder 2 to rotate, but causes micromotor to rotate without load, whereby protecting the micromotor effectively from being damaged by over load (the coil of the micromotor may be damaged by over load). When the earphone line is retracted in the second embodiment, axis 101 of the micromotor causes the decelerator means to rotate, and finally causes the winder to rotate. When the retraction of the earphone line is completed, since the user cannot turn off the power instantly, the micromotor continues to rotate. At this time, since the winder cannot continue to rotate, the micromotor is easy to be damaged and the members, such as the earphone line, are easy to be damaged due to over load if there is no clutch. By contrast, in this embodiment, because there is a clutch causing the micromotor to rotate without load, the micrometer and the members are protected effectively. In addition, the clutch can also reduce the resistant force when the user pulls the earphone line out of the winder. For example, when the user pulls the earphone out, the winder and the decelerator means disengage the micromotor because of the clutch, and at the same time, the winder rotates to let the line out while the micromotor and the decelerator means remain static.

Further, the clutch in this embodiment can be a resistance oil clutch.

Fourth Embodiment

The following is another embodiment of the invention. In this embodiment, the drive means is a spring or a clockwork spring, and the shift gear means connected to the spring or the clockwork spring is accelerator means. The structure of the accelerator means is opposite to the structure of the decelerator means in the first embodiment. Other parts in this embodiment are the same as in third embodiment. In addition, in this embodiment, the retracting switch of the earphone line retracting device is a press wheel. In addition, the clutch in this embodiment can be a resistance oil clutch. In addition, when the retraction of the earphone line is completed, the winder disengages the drive means via the clutch, whereby avoiding damaging the members such as earphone line, etc. In addition, when the earphone line is pulled out of the winder, the resistant force is also reduced.

Fifth Embodiment

Figure 5:
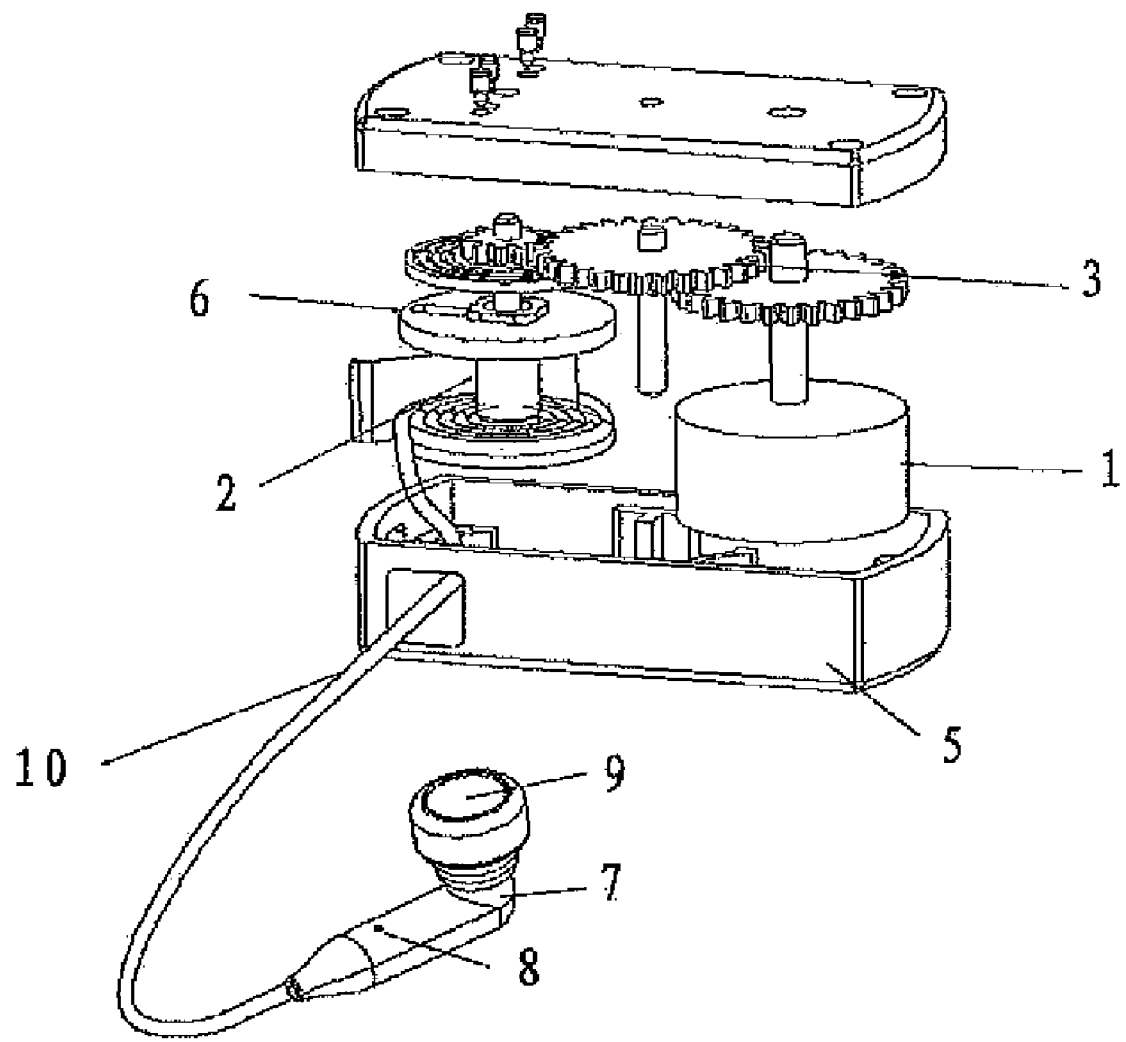
FIG. 5 is a view showing the structure of an automatic line retracting earphone of the fifth embodiment according to the present invention.

The following is description of an automatic line retracting earphone in the fifth embodiment of the invention. FIG. 5 is a view showing the structure of an automatic line retracting earphone of the fifth embodiment according to the present invention. As shown in FIG. 5, an automatic line retracting earphone according to the present invention comprises: a earphone 7 integrally formed with a voice transmitter 8 and a voice receiver 9, a earphone line 10, and an earphone line retracting device comprising a micromotor 1, a winder 2, a decelerator means 3, a signal connector means 4, a clutch 6, and a housing 5. Although earphone 7 in this embodiment is formed with voice transmitter 8 and voice receiver 9, the earphone 7 can be formed with voice transmitter 8 only or formed with voice receiver 9 only.

In the prior art, a micromotor rotates to directly drive a winder to rotate in order to retract earphone line. Because the micromotor rotates at as high as thousands rpm (rounds per minute) to tens of thousand rpm, the earphone line is retracted instantly by the winder. The too high speed of the retraction of the earphone line may cause damage to the device and to the user. By contrast, in the present invention, there is decelerator means in which gears engage each other, so that the speed of the winder reduces to a proper and safe range and at the same time increases torque of the motor, whereby solving the problems existing in the prior art.

In addition, in this embodiment, earphone line 10 is formed of a plurality of soft wires and tension-enforced fibre strands, and is coated with insulating material with high wearable property. The earphone line in this embodiment has a long service life.

Six Embodiments

The following is another embodiment of the invention. In this embodiment, the drive means is a spring or a clockwork spring, and the shift gear means connected to the spring or the clockwork spring is accelerator means. The structure of the accelerator means is opposite to the structure of the decelerator means in the fifth embodiment. Other parts in this embodiment are the same as in fifth embodiment. In addition, in this embodiment, accelerator means can increase retracting distance, whereby the earphone line retracted wholly inside the earphone line retracting device.

Seventh Embodiment

Figure 6:
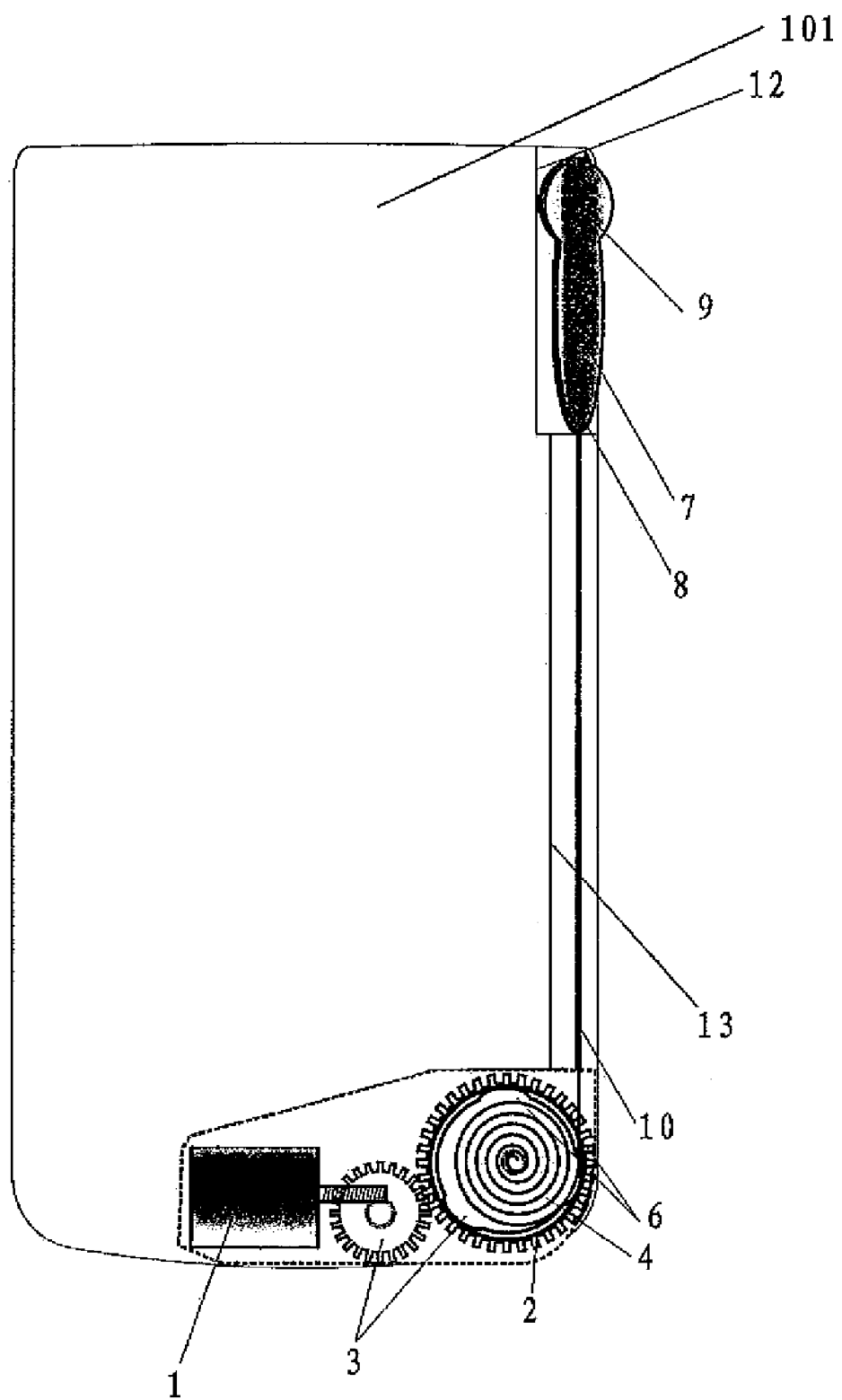
FIG. 6 is a view showing the structure of a non-radiation wire mobile phone of the seventh embodiment according to the present invention.

The following is description of a non-radiation wire mobile phone in the seventh embodiment of the invention. FIG. 6 is a view showing the structure of a non-radiation wire mobile phone of the seventh embodiment according to the present invention. As shown in the figure, a non-radiation wire mobile phone according to the present invention comprises a main body 101 of the mobile phone and an automatic line retracting earphone. The automatic line retracting earphone comprises: a micromotor 1, a winder 2, a decelerator means 3, a signal connector means 4, a clutch 6, a earphone line 10, and a earphone 7 formed with a voice transmitter 8 and a voice receiver 9. Earphone line 10 is connected to a signal line inside the mobile phone by signal connector means 4. In addition, the housing of the non-radiation wire mobile phone is provided with a socket 12 for earphone 7. Earphone 7 is inserted into socket 12. Other parts of the automatic line retracting earphone are arranged in the housing of the mobile phone. Although the earphone line retracting device of the present invention is arranged at the lower part of the mobile phone, the earphone line retracting device can also be arranged in other parts of the mobile phone.

In the prior art, a micromotor rotates to directly drive a winder to rotate in order to retract earphone line. Because the micromotor rotates at as high as thousands rpm (rounds per minute) to tens of thousand rpm, the earphone line is retracted instantly by the winder. The too high speed of the retraction of the line may cause damage to the device and to the user. By contrast, in the present invention, there is decelerator means in which gears engage each other, so that the speed of the winder reduces to a proper and safe range and at the same time increases torque of the motor, whereby solving the problems existing in the prior art.

In addition, as shown in the figure, in this embodiment, main body 101 of the mobile phone is provided at its one side with a line groove 13. One end of line groove 13 is connected to winder 2, and the other end of line groove 13 is connected to socket 12. Earphone line 10 is wound on winder 2 and extends in line groove 13 to connect to earphone 7.

In addition, in this embodiment, micromotor 1 and main body 101 of the mobile phone use the same one power source (not shown), and thus another power source for micromotor 1 is not needed.

In addition, in this embodiment, the switch of micromotor 1 uses the hangup key that is used to disconnect the line when the communication on the mobile phone is completed. Therefore, when the communication on the mobile phone is completed, the retraction of the earphone line starts when the user just presses the hangup key. Alternatively, a separate switch of micromotor 1 can be arranged.

Eighth Embodiment

The following is another embodiment of the invention. In this embodiment, the drive means in the mobile phone is a spring or a clockwork spring, and the shift gear means connected to the spring or the clockwork spring is accelerator means. The structure of the accelerator means is opposite to the structure of the decelerator means in the fifth embodiment. Other parts in this embodiment are the same as in seventh embodiment. In addition, in this embodiment, accelerator means can increase retracting distance, whereby the earphone line retracted wholly inside the earphone line retracting device.

Ninth Embodiment

Figure 7:
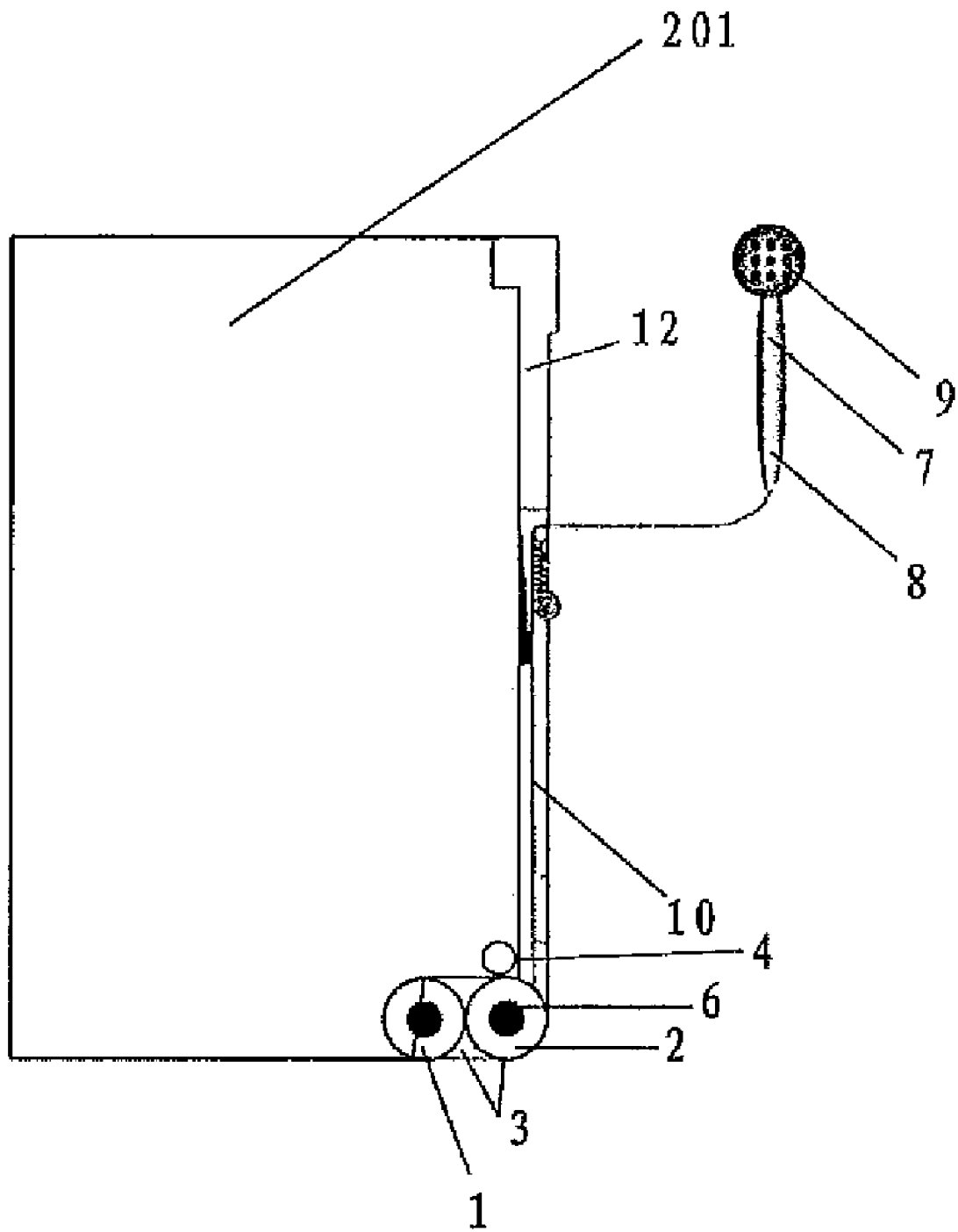
FIG. 7 is a view showing the structure of an electronic device of the ninth embodiment according to the present invention.

The following is description of an electronic device in the ninth embodiment of the invention. FIG. 7 is a view showing the structure of an electronic device of the ninth embodiment according to the present invention. In this embodiment, the electronic device can be any electronic devices, such as MP4 serial products, personal computers, hand game players, etc, which use earphone. As shown in the figure, an electronic device of the present invention comprises a main body 201 of the electronic device and an automatic line retracting earphone. The automatic line retracting earphone comprises: a micromotor 1, a winder 2, a decelerator means 3, a signal connector means 4, a clutch 6, a earphone line 10, and a earphone 7 formed with a voice transmitter 8 and a voice receiver 9. Earphone line 10 is connected to a signal line inside the mobile phone by signal connector means 4. In addition, the housing of the electronic device is provided with a socket 12 for earphone 7. Earphone 7 is inserted into socket 12. Other parts of the automatic line retracting earphone are arranged in the housing of the electronic device. Although the earphone line retracting device of the present invention is arranged at the lower part of the electronic device, the earphone line retracting device can also be arranged in other parts of the electronic device.

Tenth Embodiment

The following is another embodiment of the invention. In this embodiment, the drive means in the electronic device is a spring or a clockwork spring, and the shift gear means connected to the spring or the clockwork spring is accelerator means. The structure of the accelerator means is opposite to the structure of the decelerator means in the ninth embodiment. Other parts in this embodiment are the same as in the ninth embodiment.

What is claimed is:

1. An earphone line retracting device comprising:
a winder,
drive means driving the winder, and
signal connector means, wherein the earphone line retracting device further comprises shift gear means, by which the drive means drives the winder,
wherein a clutch is arranged between the shift gear means and the winder, and the winder connected to the shift gear means by the clutch,
wherein the drive means is a micromotor, the shift gear means is decelerator means.

2. An earphone line retracting device according to claim 1, wherein the winder has an inside space, the drive means positioned in the inside space.

3. An earphone line retracting device according to claim 1, wherein the shift gear means has at least two gears, adjacent gears engaging each other.

4. An earphone line retracting device according to claim 1, wherein the signal connector means comprises a circuit board and a plurality of annular conductive sheets, and connects to outside signal by spring feeler and its lead wire.

5. An earphone line retracting device according to claim 1, wherein the signal connector means is a wirelessly connected signal connector means.

6. An earphone line retracting device according to claim 1, wherein the clutch is a resistance oil clutch.

7. An earphone line retracting device according to claim 1, wherein the earphone line retracting device is built in the housing of an electronic device.

8. An earphone line retracting device according to claim 1, wherein the power source for the earphone line retracting device is the power source for the electronic device in which the earphone line retracting device is built.

9. An earphone line retracting device according to claim 1, wherein the retracting switch of the earphone line of the earphone line retracting device is a press wheel.

10. An automatic line retracting earphone comprising: an earphone, an earphone line, and an earphone line retracting device, wherein the earphone line retracting device is the earphone line retracting device in claim 1.

11. An automatic line retracting earphone according to claim 10, wherein the earphone is provided with a voice transmitter, and the earphone is formed integrally with the voice transmitter and a voice receiver.

12. An automatic line retracting earphone according to claim 10, wherein the earphone line is formed of a plurality of soft wires and tension-enforced fibre strands, and is coated with insulating material with high wearable property.

13. A non-radiation wire mobile phone comprising:
a main body of the mobile phone,
an earphone,
an earphone line,
an earphone line retracting device, and
a housing of the non-radiation wire mobile phone provided with a socket for the earphone, the earphone removably inserted into the socket, the earphone line and the earphone line retracting device arranged in the housing of the mobile phone,
the earphone line retracting device comprising:
a winder,
drive means driving the winder, and
signal connector means,
the earphone provided with a voice transmitter, and the earphone formed integrally with the voice transmitter and a voice receiver, wherein:

the earphone line retracting device further comprises shift gear means, by which the drive means drives the winder, and a clutch is arranged between the shift gear means and the winder, and the winder connected to the shift gear means by the clutch, wherein the drive means is a micromotor, the shift gear means is decelerator means.

14. A non-radiation wire mobile phone according to claim 13, wherein the winder has an inside space, the drive means positioned in the inside space.

15. A non-radiation wire mobile phone according to claim 13, wherein the shift gear means has at least two gears, adjacent gears engaging each other.

16. A non-radiation wire mobile phone according to claim 13, wherein the signal connector means comprises a circuit board and a plurality of annular conductive sheets, and connects to outside signal by spring feeler and its lead wire.

17. A non-radiation wire mobile phone according to claim 13, wherein the signal connector means is a wirelessly connected signal connector means.

18. A non-radiation wire mobile phone according to claim 13, wherein the non-radiation wire mobile phone is provided at its one side with a line groove, one end of the line groove connected to the winder, the other end of the line groove connected to the socket, the earphone line wound on the winder and extending in the line groove to connect to the earphone.

19. A non-radiation wire mobile phone according to claim 13, wherein the earphone line is formed of a plurality of soft wires and tension-enforced fibre strands, and is coated with insulating material with high wearable property.

20. A non-radiation wire mobile phone according to claim 13, wherein the clutch is a resistance oil clutch.

21. A non-radiation wire mobile phone according to claim 13, wherein the drive means and the main body of the mobile phone use the same one power source.

22. A non-radiation wire mobile phone according to claim 16, wherein the switch of the drive means uses the hangup key that is used to disconnect the line when the communication on the mobile phone is completed.

23. An electronic device comprising:
a main body of the electronic device,
an earphone,
an earphone line,
an earphone line retracting device,
a housing of the electronic device provided with a socket for the earphone, the earphone removably inserted into the socket, the earphone line and the earphone line retracting device arranged in the housing of the electronic device,
the earphone line retracting device comprising:
a winder,
drive means driving the winder,
signal connector means, and
shift gear means, by which the drive means drives the winder,
wherein a clutch is arranged between the shift gear means and the winder, and the winder connected to the shift gear means by the clutch,
wherein the drive means is a micromotor, the shift gear means is decelerator means.

24. An electronic device according to claim 23, wherein the electronic device is MP4 serial products.

25. An electronic device according to claim 23, wherein the electronic device is a personal computer.

26. An electronic device according to claim 23, wherein the electronic device is a hand game player.

* * * * *